US008892655B2

(12) United States Patent
Sakiyama et al.

(10) Patent No.: US 8,892,655 B2
(45) Date of Patent: Nov. 18, 2014

(54) NETWORK SCANNER

(75) Inventors: Masahiro Sakiyama, Osaka (JP); Yusuke Nagai, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 2975 days.

(21) Appl. No.: 10/702,811

(22) Filed: Nov. 5, 2003

(65) Prior Publication Data

US 2004/0093386 A1 May 13, 2004

(30) Foreign Application Priority Data

Nov. 5, 2002 (JP) .................. 2002-321555

(51) Int. Cl.
*G06F 15/16* (2006.01)
*H04N 1/00* (2006.01)
*H04L 29/08* (2006.01)
*H04N 1/32* (2006.01)

(52) U.S. Cl.
CPC .... *H04N 1/00241* (2013.01); *H04N 2201/3214* (2013.01); *H04N 1/32122* (2013.01); *H04N 2201/3204* (2013.01); *H04N 2201/3274* (2013.01); *H04N 2201/3216* (2013.01); *H04N 2201/3295* (2013.01); *H04L 69/329* (2013.01); *H04N 1/32368* (2013.01); *H04N 1/00236* (2013.01); *H04N 2201/0081* (2013.01); *H04N 2201/3222* (2013.01)
USPC ....................................... 709/206

(58) Field of Classification Search
CPC ................ H04L 29/06; G06F 3/1201–3/1207; G06F 3/1285–3/1288
USPC ....................................... 709/206
See application file for complete search history.

(56) References Cited

U.S. PATENT DOCUMENTS

| | | | | |
|---|---|---|---|---|
| 6,134,595 | A * | 10/2000 | Huang et al. ............ | 709/229 |
| 6,256,662 | B1 * | 7/2001 | Lo et al. ................. | 709/203 |
| 6,486,976 | B1 * | 11/2002 | Nakamura et al. ...... | 358/474 |
| 6,519,048 | B1 * | 2/2003 | Tanaka .................. | 358/1.13 |
| 6,532,077 | B1 * | 3/2003 | Arakawa ................ | 358/1.13 |
| 6,816,911 | B1 * | 11/2004 | Toyoda et al. ......... | 709/238 |
| 6,825,942 | B1 * | 11/2004 | Kamiyama et al. ..... | 358/1.15 |
| 6,836,789 | B1 * | 12/2004 | Toyoda ................. | 709/206 |
| 7,296,059 | B2 * | 11/2007 | Fujiwara ............... | 709/206 |
| 2001/0052003 | A1 * | 12/2001 | Seki et al. .............. | 709/219 |
| 2002/0027675 | A1 * | 3/2002 | Minato .................. | 358/1.15 |
| 2002/0051222 | A1 * | 5/2002 | Nishimura ............. | 358/402 |
| 2002/0051223 | A1 * | 5/2002 | Izumi et al. ............ | 358/402 |
| 2002/0052974 | A1 * | 5/2002 | Saito .................... | 709/247 |
| 2002/0054397 | A1 | 5/2002 | Matsushima | |
| 2002/0063905 | A1 * | 5/2002 | Hsu et al. .............. | 358/452 |

(Continued)

FOREIGN PATENT DOCUMENTS

| | | | |
|---|---|---|---|
| JP | 09-247320 A | 9/1997 | |
| JP | 2000-349952 | 12/2000 | ............ H04N 1/00 |

(Continued)

*Primary Examiner* — Christopher Biagini
(74) *Attorney, Agent, or Firm* — Edwards Wildman Palmer LLP; David G. Conlin; Steven M. Jensen

(57) ABSTRACT

A network scanner for transmitting image data as read from a document, which has been stored in a predetermined memory includes: a transmission part specifying means for specifying a part of the image data to be transmitted to said terminal(s); and specified data transmission means for transmitting the part of the image data as specified by the transmission part specifying means to the terminal(s). According to the foregoing structure, the load on communicating can be significantly reduced.

11 Claims, 6 Drawing Sheets

(56) References Cited

U.S. PATENT DOCUMENTS

| | | |
|---|---|---|
| 2002/0093690 A1 | 7/2002 | Satoh |
| 2003/0046352 A1* | 3/2003 | Katsuda et al. ............... 709/206 |
| 2003/0200266 A1* | 10/2003 | Henry .......................... 709/206 |
| 2003/0231246 A1* | 12/2003 | Gindele et al. ............. 348/222.1 |
| 2005/0275873 A1* | 12/2005 | Sekiguchi .................... 358/1.15 |
| 2006/0092468 A1 | 5/2006 | Matsushima |

FOREIGN PATENT DOCUMENTS

| | | |
|---|---|---|
| JP | 2001-186361 A | 7/2001 |
| JP | 2002-204322 A | 7/2002 |
| JP | 2002-204332 A | 7/2002 |

* cited by examiner

FIG. 3

MANAGEMENT DATA 70

| DATA ID 71 | PAGE(S) TO BE TRANSMITTED 72 | RECEIVING END 73 | REQUEST FROM TERMINAL 74 | DATA STORAGE LIMIT 75 | SCANNED DATA AFTER DATA STORAGE LIMIT 76 |
|---|---|---|---|---|---|
| Scdat001 | 1,5 | aaa@scdat.xx.zz | NO DATA TRANSMISSION REQUESTED | 2002/08/26 | TRANSMIT ALL DATA |
| | | bbb@scdat.xx.zz | ALL DATA TRANSMISSION REQUESTED | | |
| | | ccc@scdat.xx.zz | | | |
| Scdat002 | 2,3 | aaa@scdat.xx.zz | ALL DATA TRANSMISSION REQUESTED | 2002/9/10 | DELETE |
| | | ddd@scdat.xx.zz | REMAINING DATA TRANSMISSION REQUESTED | | |
| | | eee@scdat.xx.zz | NO DATA TRANSMISSION REQUESTED | | |

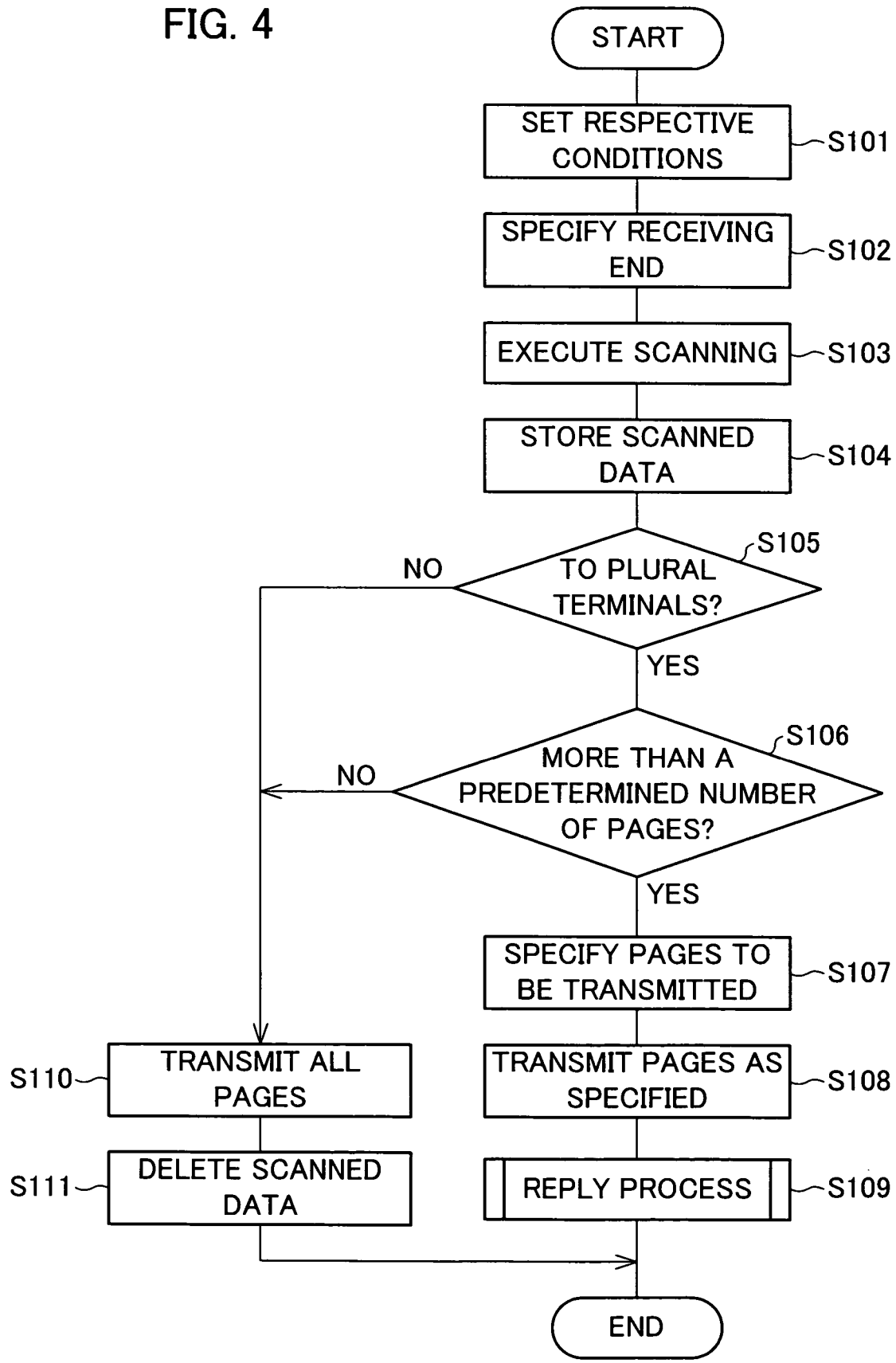

FIG. 6 (a)

THERE ARE REMAINING DATA FOR SCANNED DATA (Scdat001).
YOU CAN SELECT INSTRUCTION FROM ALL DATA TRANSMISSION,
REMAINING DATA TRANSMISSION AND NO DATA TRANSMISSION.
IF NO INSTRUCTION IS GIVEN BY AUGUST 26, 2002, YOU WILL
RECEIVE ALL THE DATA.

PLEASE MARK * IN [ ] OF THE INSTRUCTION YOU DESIRE.

--------------------------------------------------------------------

DATA ID : Scdat001 ~71
   [ ] ALL DATA TRANSMISSION REQUESTED
   [ ] REMAINING DATA TRANSMISSION REQUESTED
   [ ] NO DATA TRANSMISSION REQUESTED

THERE ARE REMAINING DATA FOR SCANNED DATA (Scdat002).
PLEASE CONNECT TO THE FOLLOWING ADDRESS, AND INSTRUCT
FOR ALL DATA TRANSMISSION, REMAINING DATA TRANSMISSION
OR NO DATA TRANSMISSION.

IF NO INSTRUCTION IS GIVEN BY SEPTEMBER 10, 2002, SCANNED
DATA WILL BE DELETED.

http://www.scdat.ccc.co.jp/Scdat002&ID=aaa@scdat.xx.zz

NETWORK SCANNER

FIELD OF THE INVENTION

The present invention relates to a network scanner for transmitting image data obtained by reading from a document to at least one of terminals connected in a network.

BACKGROUND OF THE INVENTION

In recent years, network scanners are used generally, wherein image data obtained by reading from a document are stored in a predetermined memory section, and the image data as read are transmitted to one or a plurality of terminals. Japanese Unexamined Patent Application No. 2000-349952 (published on Dec. 15, 2000) discloses a network scanner wherein a hyper text (so-called thumbnail) that includes a list of reduced images of image data as read by a network scanner is transmitted to the terminal, and by making an access to the linked address where reduced images are stored, the corresponding image data are transmitted to the terminal of the requesting end.

When reading the document by the foregoing network scanner, the user generally sets various image reading conditions, such as resolution, density, etc., (hereinafter simply referred to as reading conditions). In order for the user to confirm if the image data as he/she desires are obtained, the image data as read are opened using a predetermined application software to confirm the image data on a screen or a print sheet with his/her eyes. Therefore, the user often changes the set reading conditions while observing the image data on the screen.

In the case of network scanner, in order to perform the foregoing operation of changing the reading conditions, it is necessary to transmit the image data as read to the terminal via the network, for the user to confirm the image data at the terminal. In some cases, it is also necessary to transmit the image data as read to a plurality of terminals for respective users at the terminals to determine if any change in reading conditions are necessary.

However, since a volume of the image data is generally large, the foregoing repetitive operations of checking the set reading conditions or confirming the image data would increase a load on communicating in the network, which affects other communications within the network. Furthermore, an increased communication load would also make the communication time longer, which in turn causes such problem that it takes time for the user to obtain the image data as desired.

According to the structure disclosed by the Japanese Unexamined Patent Application No. 2000-349952, it is possible to suppress the communication load to some extent by arranging such that only the thumbnail is to be transmitted. However, it is not possible for the user to confirm the detailed conditions for the read image (i.e., if the set conditions for the resolution, density, are appropriate) only based on the thumbnail. Furthermore, it is troublesome for the user at the terminal to obtain the necessary image data again after once obtaining the thumbnail. Besides, the load on communication would increase by the transmission of the thumbnail from the network scanner.

SUMMARY OF THE INVENTION

An object of the present invention is to provide a network scanner capable of suppressing the load on communicating to the minimum, even when the set reading conditions are changed many times, or the transmission of the scanned data is performed repetitively.

In order to achieve the foregoing object, the network scanner for transmitting to one or a plurality of terminal(s), image data obtained by reading from a document, which have been stored in a predetermined memory means, is characterized by including:

transmission part specifying means for specifying a part of the image data to be transmitted to said terminal(s); and specified data transmission means for transmitting the part of the image data as specified by said transmission part specifying means to said terminal(s).

According to the foregoing structure, it is possible to transmit to the terminal only the most representative image data on one or plural pages as specified out of all the scanned image data. As a result, even when the set reading conditions are changed many times, or the transmission of the scanned data is performed repetitively, the load on performing such repetitive operations can be suppressed to the minimum, and such wasteful use of the memory as being occupied by a large volume of unnecessary image data can be avoided.

The transmission part specifying means may be arranged, for example, to specify the part of the image data to be transmitted by the page(s) or the data amount.

The foregoing network scanner may be further arranged such that the specified data transmission means transmits the part of the image data as specified only when a) the image data are to be transmitted to a plurality of terminals of the receiving ends, b) more than a predetermined pages of the image data are to be transmitted, or c) the volume of the entire image data is more than a predetermined amount, and otherwise transmits all the image data to the terminal(s).

The foregoing structure is based on the following concept. That is, in the case where none of the foregoing conditions a) to c) holds, i.e., the number of terminals of the receiving ends is small, the number of the pages of the document is small, and the total volume of the image data is small, the load on transmitting the image data is considered to be small, and it is therefore arranged such that only the image data of the part as specified is transmitted only when the foregoing factors are large and the load on transmitting the image data is considered to be heavy.

The foregoing network scanner may be further arranged so as to include the terminal request processing means capable of selectively executing the transmission of the remaining scanned image data, the transmission of all the image data, or the deletion of the scanned image data, according to a predetermined request from the terminal of the receiving end of the data transmitted by the specified data transmission means.

According to the foregoing structure, the user who confirms the part as specified of the scanned image data at the terminal can selectively request for the transmission of the remaining scanned data or all the scanned data if the specified part as confirmed is the one he/she desires; on the other hand, request for the deletion of the unnecessary image data if the specified part as confirmed is not the one he/she desires, and he/she desires to change the reading conditions of the document and read the document image again based on the changed reading conditions as a result of confirming the part of the scanned image data as specified.

The foregoing network scanner in accordance with the present invention is arranged so as to further include:

the storage limit setting means for setting the storage limit of the image data; and deletion means for deleting the image data from the memory means after the data storage limit.

According to the foregoing structure, such undesirable condition that the memory of the memory means is occupied by the image data which are no more necessary.

The foregoing network scanner of the present invention may be arranged so as to further include:

process execution means for transmitting either the remaining scanned data or all the scanned data before the image data are deleted by the deletion means.

According to the foregoing structure, an occurrence of such problem that the user fails to obtain the scanned data even when he/she forgets to obtain the remaining scanned data can be surely avoided.

Incidentally, in the network scanner of the present invention, communications with the terminal may be performed by e-mail, or the memory means may be provided in an external device capable of communicating with the network scanner.

For a fuller understanding of the nature and advantages of the invention, reference should be made to the ensuing detailed description taken in conjunction with the accompanying drawings.

BRIEF DESCRIPTION OF THE DRAWINGS

FIG. 3 is a table showing the structure of management data for use in managing the scanned data by the scanner in accordance with one embodiment of the present invention;

FIG. 4 is a flowchart showing the image reading and image transmission processes in the scanner device X in accordance with one embodiment of the present invention;

FIGS. 6(a) and 6(b) show examples of messages to be transmitted from the scanner X to the terminal together with the specified part of the scanned data, in accordance with one embodiment of the present invention.

DESCRIPTION OF THE EMBODIMENTS

The following descriptions will explain one embodiment of the present invention in reference to FIG. 1 through FIG. 5, and FIGS. 6(a) and 6(b). It is needless to mention that the following preferred embodiments and examples are not intended to limit the scope of the present invention.

Figure 1:
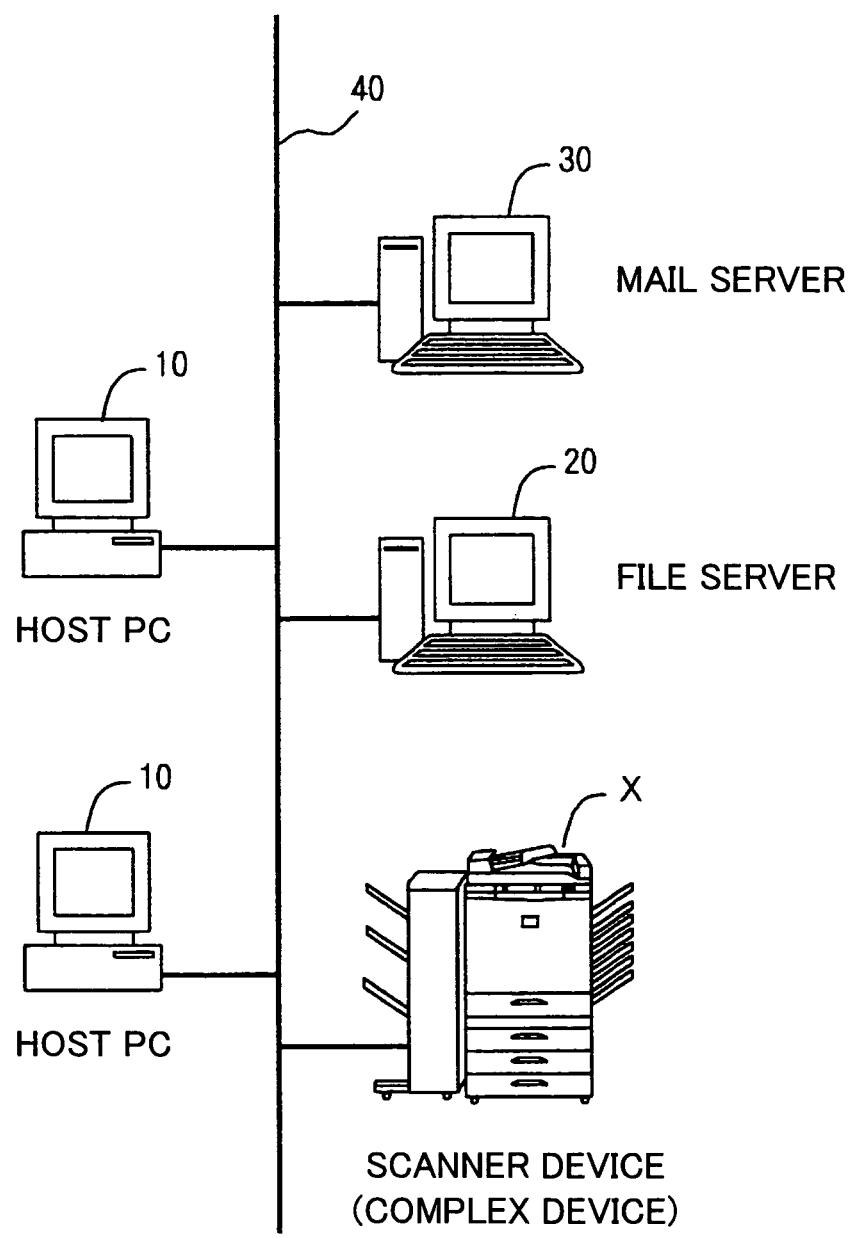
FIG. 1 is an explanatory view schematically showing the structure of an image reading system adopting a scanner device X in accordance with one embodiment of the present invention.
Figure 2:
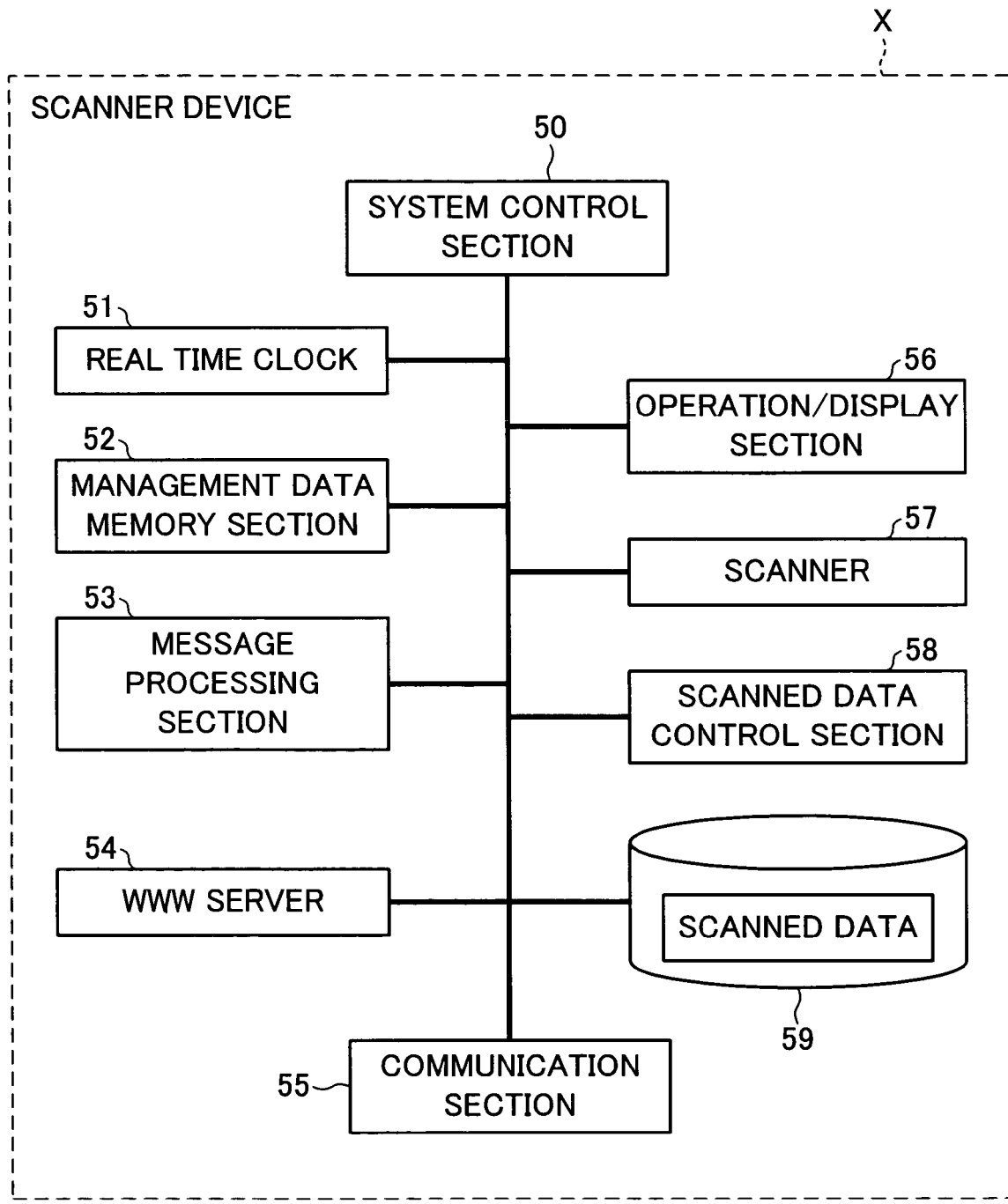
FIG. 2 is a block diagram illustrating the schematic structure of the scanner device X in accordance with one embodiment of the present invention.

FIG. 1 is an explanatory view schematically showing the structure of an image reading system adopting a scanner device X in accordance with the embodiment of the present invention. FIG. 2 is a block diagram illustrating the schematic structure of the scanner device X in accordance with one embodiment of the present invention. FIG. 3 is a table showing the structure of management data for use in managing the scanned data by the scanner in accordance with the embodiment of the present invention.

Figure 5:
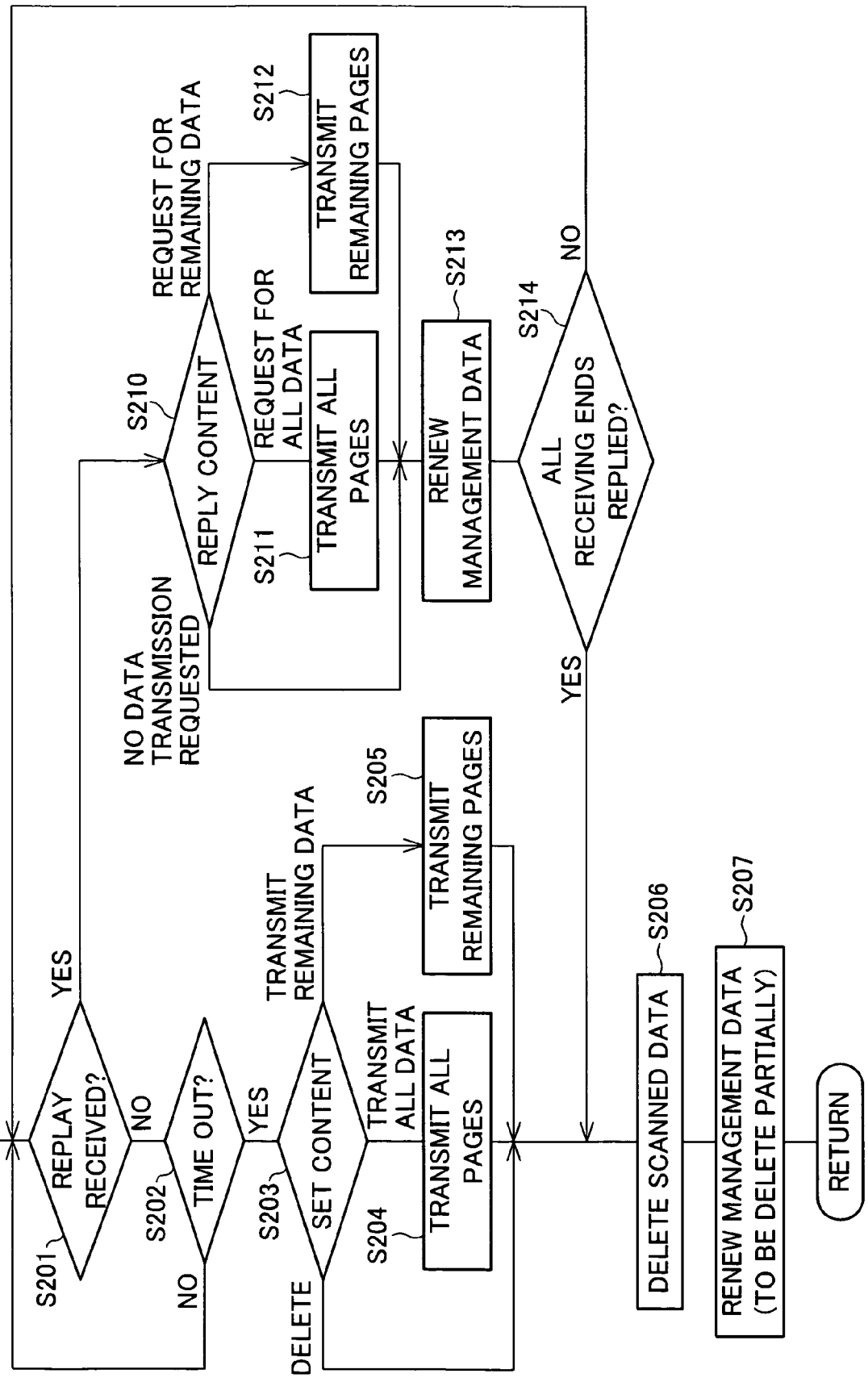
FIG. 5 is a flowchart showing the reply process from the terminal in the scanner X in accordance with one embodiment of the present invention.

FIG. 4 is a flowchart showing the image reading and image transmission processes in the scanner device X in accordance with the embodiment of the present invention. FIG. 5 is a flowchart showing the reply process from the terminal in the scanner device X in accordance with the embodiment of the present invention; and FIGS. 6(a) and 6(b) show examples of messages to be transmitted from the scanner device X to the terminal together with the specified part of the scanned data, in accordance with one embodiment of the present invention.

Firstly, the entire structure of an image reading system adopting the scanner device X in accordance with the present embodiment will be explained in reference to FIG. 1.

As illustrated in FIG. 1, the scanner device X as one example of the network scanner is arranged so as to be capable of communicating with a terminal 10 (host PC), a file server 20 and a mail server 30 via a network 40 such as LAN (Local Area Network), etc.

The terminal 10 is an information terminal such as a personal computer, etc. The terminal 10 receives the scanned data as transmitted from the scanner device X (image data as read by the scanner device X) to be stored in a memory device such as a hard disk device, etc. In the terminal 10, installed are a mail software for communicating with the scanner device X by e-mail, and an application software for opening and displaying the image data on a display device, or outputting the image data to a printer, etc., for printout.

The file server 20 is a computer for storing the scanned data as read by the scanner device X, and is functioned as an external memory device of the scanner device X.

The mail server 30 relays e-mails to be transmitted between the scanner device X and the terminal 10. The e-mail to be transmitted from the scanner device X or the terminal 10 is once stored in the mail server 30, and in response to a request from the scanner device X or the terminal (mail software), the corresponding e-mail as requested is sent from the main server 30.

FIG. 2 is a block diagram illustrating the schematic structure of the scanner device X in accordance with the present embodiment.

As illustrated in FIG. 2, the scanner device X includes a system control section 50, a real time clock 51, a management data memory section 52, a message processing section 53, a WWW server 54, a communication section 55, an operation/display section 56, a scanner 57, a scanned data management section 58, and a data storage section 59.

The system control section 50 is made up of a CPU and peripheral equipments and a control program, etc., to be executed by the CPU and controls the overall scanner device X.

The real time clock 51 is a timer for measuring date and time with a so-called calendar function.

The management data storage section 52 is provided for storing the management data including the information for specifying the part to be transmitted, the scanned data storage limit, the receiving end of the scanned data (address of the terminal 10), etc. The information for specifying the part to be transmitted is used to specify the part of the image data obtained by reading from the document by the scanner 57, and this data are hereinafter referred to as scanned data.

The message processing section 53 is provided for transmitting a predetermined message by e-mail to the terminal 10.

The WWW server 54 transmits a hyper text (screen data in HTML or XML, etc.) to the terminal 10 and performs a variety of processes as requested from the terminal 10.

The communication section 55 is arranged so as to be capable of communicating with the terminal 10, the file server 20 and the mail server 30 via the network 40.

The operation/display section 56 is, for example, a liquid crystal touch panel, etc., which allows the user to perform an input operation, and which displays information. The transmission condition data and the image reading conditions (resolution, density, etc.) of the scanner 57, etc., are set (input) by the operation/display section 56.

The scanner 57 is an image reading device for reading image data from the document as placed on a predetermined document platen. This scanner 57 is made up of the CCD (Charge Coupled Device), an optical system, etc.

The scanned data management section 58 transmits via the communication section 55 (together an example of the specified data transmission means) a part or all the scanned data to be stored in the data storage section 59 to the terminal 10 based on the transmission limit or a predetermined request sent from the terminal 10.

The data storage section 59 is a storage device such as a hard disk device, etc., for storing the data scanned (image data) by the scanner 57 or various other data. Here, it may be arranged such that the data to be stored in the data storage section 59 are stored in the file server 20. In the following, the explanations or structure with regard to the data storage section 59 can be applied to the file server 20.

The scanner device X of the present invention is provided with members generally provided in the network scanner other than the members illustrated in FIG. 2. However, such members do not constitute parts of the present invention, and therefore the explanations thereof shall be omitted here.

FIG. 3 shows the structure of the management data (the part to be transmitted specifying data, the data storage limit, etc.) as stored in the management data storage section 52.

As illustrated in FIG. 3, the management data 70 includes data ID 71 for specifying respective scanned data, the part to be transmitted specifying data for specifying pages of the document to be transmitted to the terminal 10 for respective scanned data; one or a plurality of receiving ends 73 (e-mail address(es) of the terminal(s)) for respective scanned data, the request data from terminal 74 indicative of the content of the request (reply to the receipt of the scanned data) from each receiving end 73; the data storage limit 75 of each scanned data; and the data on the process after the data storage limit 76 which specifies how the scanned data is to be processed after the data storage limit.

The data ID 71 is set by the scanned data management section 58 for each set of scanned image data obtained by reading from the document image by the scanner 57. The scanned data can be specified by the data ID 71.

The transmission part specifying data 72 is set by the user by operating the operation/display section 56 (an example of the transmission part specifying means). Specifically, the user can specify one or a plurality of representative pages which he/she thinks it appropriate for the confirmation of the image data when setting (adjusting) reading conditions. Here, it may be arranged such that the transmission part specifying data 72 can be set automatically by the scanned data management section 58. In this case, for example, the transmission part of the scanned data can be set automatically, by setting, for example, of all the pages of the scanned data (document), a predetermined number of pages from the first page, or the page on which an image is formed using a largest number of colors, or the page containing an image of a largest data size can be set.

Not only the foregoing structure of specifying the transmission part of the scanned data by pages, the structure which specifies the transmission part of the scanned data by the data amount may be adopted. Specifically, the transmission part of the scanned data can be specified by specifying the amount of data from the beginning of the scanned data, or specifying the amount of data from the begging which can be stored within a predetermined number of pages.

The receiving end 73 is set by the operation of the operation/display section 56. With the structure of the present invention, a plurality of receiving ends 73 can be set, and in this case, a part or all the scanned data are transmitted to the plurality of receiving ends 73 as specified. The receiving end 73 is an electric mail address, and the scanned data are transmitted in e-mail as an attachment file. The scanned data (e-mail thus transmitted) is once stored in the mail server 30, and in response to a transmission request for a newly received mail from the terminal 10 to the mail server 30, the e-mail is transmitted from the mail server 30 to the terminal 10.

By the request data from terminal 74, the request content to be transmitted from the terminal of the user who confirmed the scanned data can be specified to be either one of the instructions: a) no transmission of scanned data is requested, b) the transmission of all scanned data is requested, and c) the transmission of a part of scanned data is requested. In the table of FIG. 3, the blank indicates that any instruction has not yet being received.

The data storage limit 75 is set by the user by operating the operation/display section 56 (storage limit setting means). In the case where the scanned data remains in the data storage section 59 after the data storage limit 75, the remaining scanned data are deleted by the scanned data management section 58. Here, it may be arranged so as to set the data storage limit 75 automatically by the scanned data management section 58 (data storage limit setting means). In this case, for example, upon completing the reading by the scanner 57, a set dates after the date on which the reading of the image by the scanner 57 is completed is set as the data storage limit 75.

The process after storage limit data 76 is set by the user by operating the operation/display section 56. Before deleting the scanned data after the data storage limit 75, It is set if the entire scanned data is to be transmitted or the remaining part (pages) of the scanned data, that is the remaining data after transmitting the part of the scanned data according to the transmission part specifying data 72 before deleting the scanned data after the data storage limit. If not particularly specified by the user, the scanned data are to be deleted without being transmitted.

The image reading process and image transmitting process by the scanner device X in accordance with the present invention will be explained in reference to the flowchart of FIG. 4. In the following explanations, S101, S102, . . . indicate the steps in the image reading process and the image transmitting process.

The reading conditions (resolution, density, color/monochrome, image format, etc.), the data storage limit 75, and the process after storage limit data are set by the user by operating the operation/display section 56 in S101. Further, the receiving end 73 is also set by the user by operating the operation/display section 56 in S102. After the foregoing conditions are set in S101 and S102, a predetermined scanning operation is started. The image data (scanned data) are then read out from the document by the scanner 57 (S103).

The scanned data as read by the scanner are stored in the data storage section 59 in S104, and it is determined if the scanned data are to be transmitted to a plurality of receiving ends (condition 1) and if the number of pages to be transmitted is larger than the predetermined number of pages (condition 2) in S105 and S106. In the case where only either one of the conditions 1 and 2 holds, it is determined that the load on transmitting the scanned data is small. In this case, all the scanned data (all pages) are transmitted to the receiving end 73 as specified in S102 by the scanned data management section 58 (via a communication section 55). Thereafter, the scanned data are deleted from the data storage section 59 (S111), thereby completing the process.

On the other hand, in the case where both of the conditions 1 and 2 hold, the set screen of the transmission part specifying data 72 is displayed in the operation/display section 56, and the transmission part specifying data 72 (transmission pages) are set (specified) by the user in S107. Needless to mention, it may be arranged so as to set the transmission part automatically.

Next, by the scanned data management section 58, the page as specified in S107 from the scanned data is extracted by the scanned data management section 58, and only the specified pages are transmitted in e-mail to the receiving end 73 (S108). Thereafter, the reply process (S109) is performed in response to the reply (request), thereby completing the process. For the data transmission step in S108, in the case where a plurality of receiving ends 73 are set, the e-mail is transmitted to the plurality of receiving ends 73 (e-mail with the specified pages as an attachment).

FIG. 6(a) shows one example of a message (e-mail) to be transmitted from the scanner X to the terminal 10 with the scanned data as specified in S108.

As shown in FIG. 6(a), the e-mail to be transmitted in S108 contains the data ID 71 of the scanned data. With this structure, the return mail from the terminal 10 in response to the e-mail to be transmitted contains the data ID 71, whereby it is possible to specify the return mail corresponds to which scanned data.

Further, the terminal 10 can make a request with respect the scanner device X in response to the e-mail as received in S108 by the return mail by the following structure. That is, the e-mail as received contains three options for the instruction to the scanner device X, i.e., a) transmission of all the scanned data is requested, b) transmission of remaining scanned data other than the received part as specified is requested, and c) no transmission of the scanned data is requested. With this structure, the user can make a request with respect to the scanner device X with ease by merely marking the corresponding option as ○, for example.

It may be arranged such that the e-mail contains the URL of the home page (hereinafter referred to as home page for request by terminal) for making the request with respect to the scanner device X as illustrated in FIG. 6(b). With this structure, the user can select the instruction with respect to the scanner device X among three options. Further, by registering the home page for the terminal request data, for transmitting the request as specified to the scanned data management section 58, the web browser can be driven by making a click on the URL by the terminal 10, and the terminal 10 can access to the homepage for the terminal request, and the request from the terminal 10 can be received.

The e-mail shown in FIG. 6(a) and FIG. 6(b) is formed by the message processing section 53.

As described, according to the scanner device X of the present invention, it is possible to transmit a part of the scanned data as specified to the terminal 10. It is therefore possible to suppress the load on changing the reading conditions many times or repetitively transmitting scanned data as compared to the conventional structure.

According to the embodiment of the present invention, the transmission part of the scanned data can be specified only when both of the conditions 1 and 2 hold. It may be arranged so as to permit the transmission part of the scanned data to be specified when either one of the conditions 1 and 2 holds, or without setting any condition.

The reply process in response to the reply (return mail in response to the mail transmission of the specified part of the scanned data) from the terminal 10 in S109 of FIG. 4 will be explained in reference to the flowchart of FIG. 5.

Firstly, it is checked by the message processing section 53 if the return mail from the terminal 10 has been received before the data storage limit for each scanned data in S201 and S202. If YES in S201, i.e., the return mail (request) from the terminal 10 has been received before the data storage limit, the request data from terminal 74 are determined based on the return mail in S210.

Further, when it is determined that the request data from terminal 74 is determined to be the one requesting for no data transmission, the request data is set in the management data 70 (the previous management data 70 is to be renewed) in S213.

On the other hand, when it is determined that the request data from terminal 74 is determined to be the one requesting for the transmission of all the scanned data, all the scanned data (all pages) are transmitted in e-mail to the terminal 10 (receiving end 73) of the return mail in S211). Then, the terminal request data 74 is set for the management data 70 (previous management data is to be renewed) in S213.

Further, when it is determined that the request data from terminal 74 is determined to be the one requesting for the transmission of remaining data, the remaining part of the scanned data after transmitting the part as specified by the transmission part specifying data 72 is transmitted to the terminal 10 of the transmitting end of reply mail in an attachment of an e-mail in S212. Thereafter, the terminal request data 74 is set to the management data 70 (previous management data 70 is to be renewed) in S213.

Here, the corresponding scanned data of the return mail can be recognized by the data ID 71 contained in the return mail.

After the management data 70 is renewed, the scanned data management section 58 checks with respect to the scanned data corresponding to the return mail if all the receiving ends 73 (all the users) have replied, i.e., if there is no blank in the table for the terminal request data 74 of the management data 70 shown in FIG. 3 in S214. If it is determined that all the receiving ends 73 have replied, the corresponding scanned data are deleted from the data storage section 59 in S206. Further, the management data of the part corresponding to the scanned data as deleted from the management data 70 is renewed (S207), thereby completing the reply process.

On the other hand, when it is determined in S214 that not all the receiving ends 73 have replied, the sequence goes back to S201.

As described, according to the scanner device X of the present embodiment, in response to the request (return mail) from the terminal 10, the remaining part of the scanned data are either returned to the terminal 10, or deleted without being transmitted to the terminal 10. According to this structure, when it is necessary to reset the reading conditions, the scanned data can be deleted; on the other hand, when the set conditions are appropriate, the remaining part of the scanned data can be input to the terminal 10. As a result, even when the set reading conditions are changed many times, or the transmission of the scanned data is performed repetitively, the load on performing such repetitive operations can be suppressed to the minimum. Furthermore, since unnecessary data are to be deleted, storage of a large amount of unnecessary data in the data storage section 59 can be avoided.

If the data storage limit has passed in S201 and S202 (YES in S202), the scanned data management section 58 checks the set content in the data on the process after the data storage limit 76 in S203. If the content is determined to be the one indicative of deletion (any process of the scanned data is set to be carried out before deleting the scanned data after the data storage limit), the corresponding scanned data is to be deleted in S206. Further, after renewing the part corresponding to the scanned data as deleted from the management data 70 in S207, the reply process is completed.

On the other hand, in the case where the set content in the data on the process after the data storage limit 76 is to transmit all the scanned data, the corresponding entire scanned data (all pages) are transmitted in e-mail to the terminal 10 of the receiving end of the return mail in S204.

On the other hand, in the case where the set content in the data on the process after the data storage limit 76 is to transmit the remaining scanned data, i.e., the remaining scanned data that have not been transmitted, the remaining scanned data are transmitted in e-mail to the terminal 10 of the transmitting end of the return mail (receiving end 73) in S205.

Upon completing the process of transmitting all the scanned data or remaining scanned data, the corresponding scanned data are deleted from the data storage section 59 in S206. Further, the corresponding part of the scanned data as deleted is also deleted from the management data 70, i.e., the management data 70 is renewed in S207, thereby completing the return process.

As described, according to the structure of the present embodiment, the process before being deleted of the scanned data after the data storage limit 76 can be specified. Therefore, an occurrence of such problem that the user fails to obtain the scanned data even when he/she forgets to obtain the remaining scanned data can be surely avoided.

As explained, according to the network scanner of the present invention, the user can specify a part of the image data as read by the scanner (scanned data) to be transmitted, even when set reading conditions are changed main times, or the transmission of the scanned data is performed repetitively, the load on performing such repetitive operations can be suppressed to the minimum.

Furthermore, being provided with the function of transmitting the remaining part of the image data by a request (return mail) from the terminal or deleting the scanned data without transmission, it is possible to selectively delete the unnecessary image data without transmission. As a result, even when set reading conditions are changed many times, or the transmission of the scanned data is performed repetitively, the load on performing such repetitive operations can be suppressed to the minimum, and such wasteful use of the memory as being occupied by a large volume of unnecessary image data can be avoided.

As described, according to the structure of the present embodiment, the process before being deleted of the scanned data after the data storage limit 76 can be specified. As a result, an occurrence of such problem that the user fails to obtain the scanned data even when he/she forgets to obtain the remaining scanned data can be surely avoided.

As described, a network scanner in accordance with the present invention which transmits image data obtained by reading from a document which have been stored in a predetermined memory means to one or a plurality of terminals connected in a network is characterized by including: transmission part specifying section for specifying a part of the image data to be transmitted to the terminal; and specified data transmission means for transmitting the specified part of the image data to the terminal.

According to the foregoing structure, it is possible to transmit to the terminal only the most representative image data on one or plural pages as specified out of all the scanned image data. As a result, even when the set reading conditions are changed many times, or the transmission of the scanned data is performed repetitively, the load on performing such repetitive operations can be suppressed to the minimum, and such wasteful use of the memory as being occupied by a large volume of unnecessary image data can be avoided.

The transmission part specifying means may be arranged, for example, to specify the part of the image data to be transmitted by the page(s) or the data amount.

The foregoing network scanner may be further arranged such that the specified data transmission means transmits the part of the image data as specified only when the image data are to be transmitted to a plurality of terminals of the receiving ends, more than a predetermined pages of the image data are to be transmitted, or the volume of the entire image data is more than a predetermined amount, and otherwise transmits all the image data to the terminal(s).

The foregoing structure is based on the following concept. That is, in the case where none of the foregoing conditions a) to c) holds, i.e., the number of terminals of the receiving ends is small, the number of the pages of the document is small, and the total volume of the image data is small, the load on transmitting the image data is considered to be small, and it is therefore arranged such that only the image data of the part as specified is transmitted only when the foregoing factors are large and the load on transmitting the image data is considered to be heavy.

The foregoing network scanner has a terminal request processing means that includes the data management section 58 in association with the communication section 55, and the WWW server 54 in association with their functions of (i) the receipt of a request from the terminal 10 by the data management section 58 via the communication section 55 and the WWW server 54, and (ii) causing the deletion or transmission of data. Thus, the terminal request processing means is capable of selectively executing the transmission of remaining scanned image data, the transmission of all the image data, or the deletion of the scanned image data, according to a predetermined request from the terminal of the receiving end of the data transmitted by the specified data transmission means.

According to the foregoing structure, the user who confirms the part as specified of the scanned image data at the terminal can selectively request for the transmission of the remaining scanned data or all the scanned data if the specified part as confirmed is the one he/she desires; on the other hand, request for the deletion of the unnecessary image data if the specified part as confirmed is not the one he/she desires, and he/she desires to change the reading conditions of the document and read the document image again based on the changed reading conditions as a result of confirming the part of the scanned image data as specified.

The foregoing network scanner in accordance with the present invention is arranged so as to further include:
the storage limit setting means for setting the storage limit of the image data; and deletion means for deleting the image data from the memory means after the data storage limit.

According to the foregoing structure, such undesirable condition that the memory of the memory means is occupied by the image data which are no more necessary.

The foregoing network scanner of the present invention may be arranged so as to further include:
process execution means for transmitting either the remaining scanned data or all the scanned data before the image data are deleted by the deletion means.

According to the foregoing structure, an occurrence of such problem that the user fails to obtain the scanned data even when he/she forgets to obtain the remaining scanned data can be surely avoided.

Incidentally, in the network scanner of the present invention, communications with the terminal may be performed by e-mail, or the memory means may be provided in an external device capable of communicating with the network scanner.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A network scanner comprising a memory,
   wherein the network scanner is configured to transmit image data to one or a plurality of terminal(s) which is(are) connected with a network, and the image data is obtained by reading from a document and then storing the image data in said memory, and said network scanner further comprises:
   a transmission part specifying section that specifies a part of the image data to be transmitted to said terminal(s);
   a transmission section that transmits the part of the image data specified by the transmission part specifying section to said terminals; and
   a terminal request processing section that receives a request from said terminal(s), which has(have) received the part of the image data specified by the transmission part specifying section, and
   (i) determines whether or not the request indicates deletion, and upon determining that the request indicates deletion, causes the deletion of the image data from the memory, and
   (ii) determines whether or not the request indicates transmission, and upon determining that the request indicates transmission, causes said transmission section to transmit
   (a) a remaining part of the image data or
   (b) a whole of the image data to said terminal(s),
   wherein an entire image data of a whole document is not transmitted to said terminal(s) as a pre-scanned image data;
   wherein the image data is sent to said terminal(s) for the first time after the part of the read image data to be transmitted is specified; and
   wherein the network scanner transmits to said terminal(s), along with the part of the read image data as specified, a query about a remaining unspecified part of the read image data.

2. The network scanner as set forth in claim 1, wherein:
   said transmission part specifying section specifies the transmitted part of the image data by automatically specifying page(s) of the document.

3. The network scanner as set forth in claim 2, wherein:
   said transmission part specifying section specifies the transmitted part of the image data by specifying a predetermined number of pages from the first page of the document.

4. The network scanner as set forth in claim 2, wherein:
   said transmission part specifying section automatically sets a page among all the pages of the scanned data, on which an image is formed using a largest number of colors as the transmission part of the image data.

5. The network scanner as set forth in claim 2, wherein:
   said transmission part specifying section automatically sets a page with an image of a largest data size as the transmitted part of the image data.

6. The network scanner as set forth in claim 2, wherein:
   said transmission part specifying section automatically sets data in a predetermined amount from the top of the image data as the transmitted part of the image data.

7. The network scanner as set forth in claim 2, wherein:
   said transmission part specifying section automatically sets data on page(s) from the first page, in which an amount of scanned data as specified can be stored, as the transmitted part of the image data.

8. The network scanner as set forth in claim 1, wherein:
   the specified data transmission section transmits the part of the image data as specified by said transmission part specifying section only when the image data are to be transmitted to a plurality of terminals of the receiving ends, more than a predetermined pages of the image data are to be transmitted, or the volume of the entire image data is more than a predetermined amount, and otherwise transmits all the image data to the terminal(s).

9. The network scanner as set forth in claim 1, further comprising:
   storage limit setting software for setting the storage limit of the image data; and deletion software for deleting the image data from the memory after the data storage limit.

10. The network scanner as set forth in claim 9, wherein:
    said terminal request processing section causes a transmission of either the remaining scanned data or all the scanned data before the image data are deleted by said deletion software.

11. The network scanner as set forth in claim 1, which communicates with said terminal(s) by e-mail.

* * * * *